United States Patent [19]
Miura et al.

[11] Patent Number: 5,150,340
[45] Date of Patent: Sep. 22, 1992

[54] DISC APPARATUS FOR READING OUT INFORMATION FROM DISC RECORDING MEDIUM

[75] Inventors: Tohru Miura, Mitaka; Miya Umeda, Tokorozawa; Katsuya Enami, Houya, all of Japan

[73] Assignee: Teac Corporation, Japan

[21] Appl. No.: 618,656

[22] Filed: Nov. 27, 1990

[30] Foreign Application Priority Data

Nov. 28, 1989 [JP] Japan .................... 1-136892[U]

[51] Int. Cl.⁵ .................. G11B 17/22; G11B 33/02; G11B 23/00; G11B 15/18
[52] U.S. Cl. ........................ 369/33; 369/75.2; 369/77.1; 369/270; 360/69; 360/71
[58] Field of Search ............ 369/33, 34, 32, 75.1, 369/77.2, 75.2, 77.1, 270, 271; 360/55, 60, 61, 62, 69, 73.01, 71

[56] References Cited

U.S. PATENT DOCUMENTS

| | | | |
|---|---|---|---|
| 4,578,787 | 3/1986 | Shimizu et al. | 369/77.2 |
| 4,641,294 | 2/1987 | Yoshimaru | 369/32 |
| 4,660,189 | 4/1987 | Tsukamura et al. | 369/33 X |
| 4,680,744 | 7/1987 | Kanamaru | 369/58 X |
| 4,853,913 | 8/1989 | Maeda | 369/32 |
| 4,918,676 | 4/1990 | Miyasaka | 369/33 X |

OTHER PUBLICATIONS

"Updata Floppy Disc Apparatus and Application Know-How Thereof", S. Takahashi, *CQ Publications*, 1984.

*Primary Examiner*—Stuart S. Levy
*Assistant Examiner*—Tan Nguyen
*Attorney, Agent, or Firm*—Andrus, Sceales, Starke & Sawall

[57] ABSTRACT

A disc apparatus includes a drive mechanism rotatively driving a disc recording medium and having a motor and a chucking mechanism provided on a shaft of the motor, a head reading out information from the disc recording medium, a disc loading detector for outputting a loading detection signal when the disc recording medium has been loaded into the disc apparatus, a chucking control circuit outputting a motor rotation control signal for driving the motor during a chucking operation by the chucking mechanism, a motor drive control circuit driving the motor when at least one of a motor rotation control signal from the chucking control circuit and from an external information processing apparatus controlling the disc apparatus are supplied, an information output circuit supplying information obtained from the head to the external information processing apparatus during the motor is rotated on basis of the motor rotation signal, and an output prohibit circuit prohibiting the supply of information from the information output circuit to the external information processing apparatus while the motor rotation control is being output from the chucking control circuit.

8 Claims, 9 Drawing Sheets

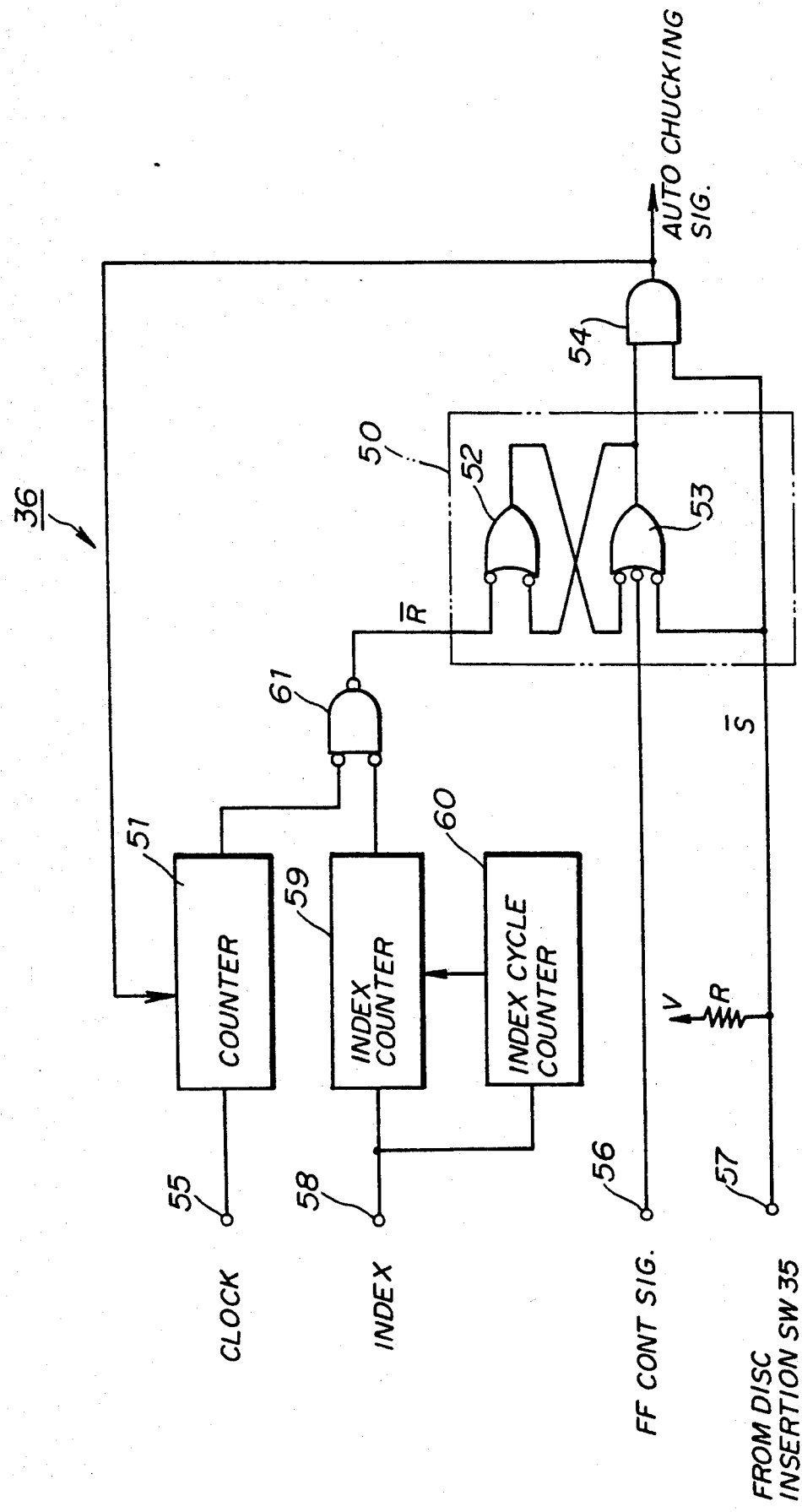

DISC APPARATUS FOR READING OUT INFORMATION FROM DISC RECORDING MEDIUM

BACKGROUND OF THE INVENTION

The present invention generally relates to a disc apparatus for reading out information from a disc recording medium as a flexible disc (FD) or the like. The present invention is more particularly concerned with the disc apparatus, including a driving mechanism rotatively driving the disc recording medium and a head reading out information from the disc recording medium, improved in the reading out information just after the disc recording medium has been loaded into the disc apparatus.

The disc recording media such as flexible disk (FD) are used as auxiliary storage media in many types of information processing equipment (such as office computers, word processors and the like). The fundamental configuration of the entirety of such an information processing apparatus is as indicated in FIG. 9.

The information processing apparatus 20 includes a central processing unit (hereinafter termed a CPU) 21 that performs control of the entirety, a memory 22 that performs write and read of information by the CPU 21, and I/O units 23 such as displays and the like, a flexible disc drive control circuit (hereinafter termed a FDD control circuit) 24. The CPU 21, the memory 22, I/O units 23 and the FDD control circuit 24 are connected by a bus 25. Multiple flexible disc drive apparatus (hereinafter termed FDD) 30(1) through 30(n) are provided to the information processing apparatus 20. That is, each of the FFD 30(1) through FDD 30(n) are connected to the FDD control circuit 24 by a FDD bus 26.

The FDD 30(1) through 30(n) drive 3.5 inch flexible discs for example, and have a configuration as disclosed in "UPDATE FLOPPY DISC APPARATUS AND APPLICATION KNOW-HOW THEREOF" (S. TAKAHASHI CQ Publication Inc. 1984).

Each of the FDD 30(l) through 30(n) are provided with a drive mechanism that rotates the flexible disc and a head that reads out and writes information from and to the flexible disc. The drive mechanism includes a motor rotating the flexible disc and a chucking mechanism provided on a shaft of the motor. When the flexible disc has been loaded into the FDD, the motor rotates and the center of the flexible disc is positioned to the rotative shaft of the motor and then the flexible disc is supported and fixed by the chucking mechanism (chucking operation).

The FDD control circuit 24 performs drive control of each of the FDD 30(1) through 30(n) on the basis of instructions from the CPU 21. Index pulses in synchronization with the rotational cycle of the flexible disc and the read data are output from the FDD. The control relating to data read from the FDD is as described in the following.

The FDD control circuit 24 outputs two types of signals for data output requests from CPU 21. These two types a the MOTOR ON signal and a DRIVE SELECT signal. The MOTOR ON signal is a signal that performs the motor drive instruction. The DRIVE SELECT signal is a signal that indicates which of a plural number of FDD 30(1) through 30(n) has been selected. This DRIVE SELECT signal is output from the FDD control circuit 24 even if there is only one FDD connected. The motor of the specified FDD by the DRIVE SELECT signal from the FDD control circuit 24 is driven according to the MOTOR ON signal. When the motor has been driven and the flexible disc has rotated, the read data and the index pulses are output from the FDD. The FDD control circuit 24 inputs the read data and the index pulses output from the FDD via FDD bus 26. Then the FDD control circuit 24 supplies the read data and the index pulses to the CPU 21 via the bus 25.

As aforementioned, when the FDD is supplied the MOTOR ON signal from the information processing apparatus 20, immediately the motor of the FDD is rotated and then the read data and the index pulses are output from the FDD.

The conventional disc apparatus such as the FDD above described does not perform the right data reading, if the motor rotation control signal (such as the MOTOR ON signal) is supplied from the information processing apparatus (accessed from the information processing apparatus) during the chucking operation just after the flexible disc is loaded into the disc apparatus. Because the rotation of the disc is especially unstable during the chucking operation. The data read out during the chucking operation causes errors in the information processing apparatus supplied with the data.

SUMMARY OF THE INVENTION

Accordingly, it is a general object of the present invention to provide a novel and useful disc apparatus, in which the problems described heretofore are eliminated.

A more specific object of the present invention is to provide a disc apparatus which does not output the data when the motor is rotated for the chucking operation for the disc, even if the disc apparatus is accessed from the external processing apparatus.

The above objects are achieved by a disc apparatus, comprising a drive mechanism rotatively driving a disc recording medium recording information and having a hub at a center thereof, the drive mechanism including a motor and a chucking mechanism provided on a shaft of the motor, the chucking mechanism supporting and fastening the hub of the disc recording medium at a regular position that is given by positioning the center of the disc recording medium which has been loaded into the disc apparatus to the shaft of the motor, a head reading out information from the disc recording medium, disc loading detection means for outputting a loading detection signal when the disc recording medium has been loaded into the disc apparatus, chucking control means for outputting a motor rotation control signal for driving the motor so that the hub of the disc recording medium is supported and fastened at the regular position by the chucking mechanism when the loading detection signal is output from the disc loading detection means, motor drive control means for driving the motor when at least one of a motor rotation control signal from the chucking control means and a motor control signal from an external information processing apparatus controlling the disc apparatus are supplied, information output means for supplying information obtained from the head to the external information processing apparatus when the supply of the motor rotation control signal from the external information processing apparatus causes the motor to rotate, and output prohibit means for prohibiting the supply of information from the information output means to the external information processing apparatus while the motor rotation control signal is being output from the chucking control means.

BRIEF DESCRIPTION OF THE DRAWINGS

FIG. 4 is a view showing a second configuration of an automatic chucking control circuit;

DESCRIPTION OF THE PREFERRED EMBODIMENTS

Figure 1:
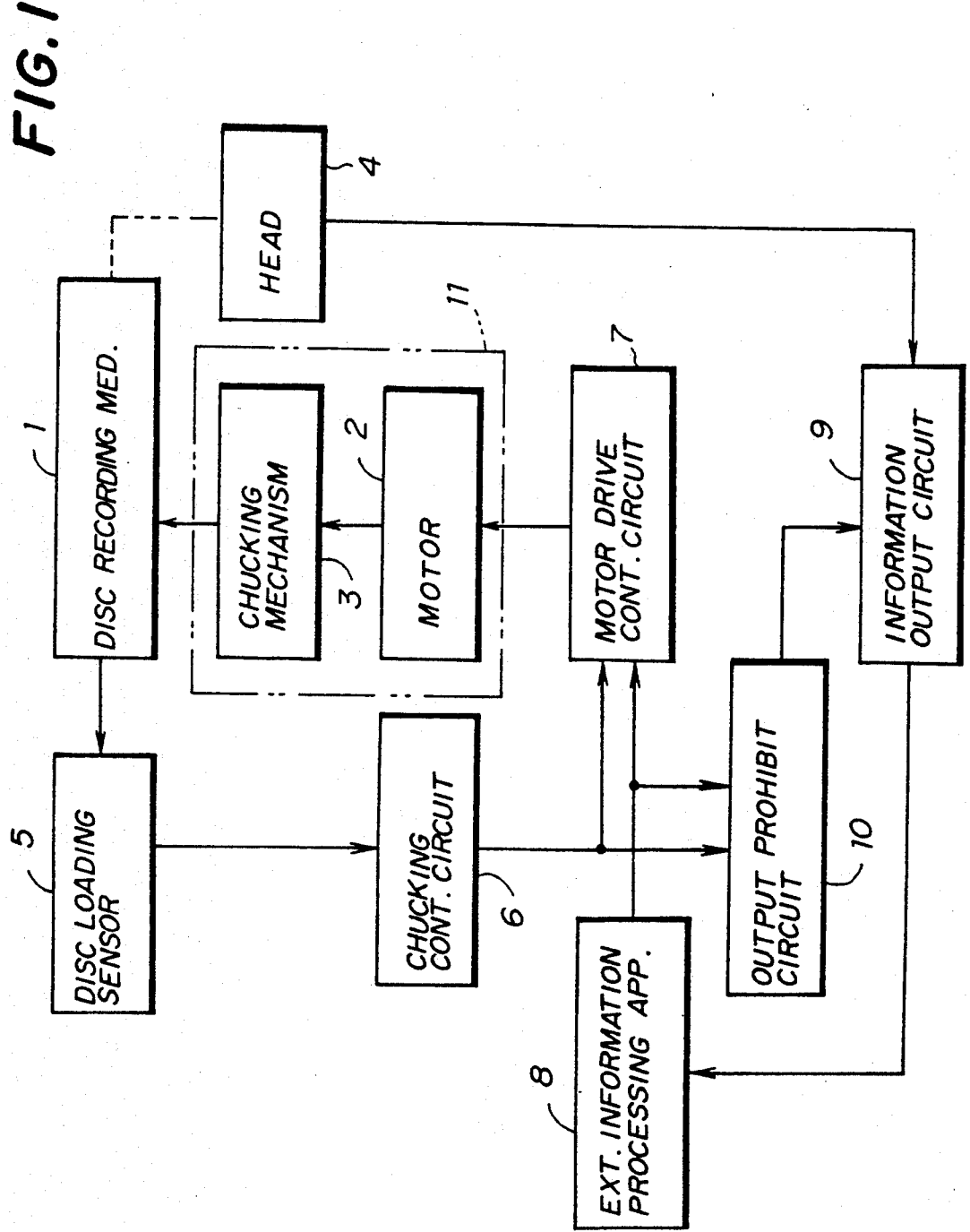
FIG. 1 is a view showing the configuration describing the principle of the disc apparatus according to the present invention.

A configuration describing the principle of the disc apparatus according to the present invention is shown in FIG. 1.

The disc apparatus comprises a disc recording medium 1, a drive mechanism 11, a head 4, a disc loading sensor 5, a chucking control circuit 6, a motor drive control circuit 7, an information output circuit 9, and an output prohibit circuit 10.

The drive mechanism 11 rotatively drives the disc recording medium 1 recording information and having a hub on the center thereof. The head 4 reads out information from the disc recording medium 1. The drive mechanism 11 include a motor 2 and a chucking mechanism 3. The chucking mechanism is provided on a shaft of the motor 2, supports and fastens the hub of the disc recording medium 1 at the regular position that is given by positioning the center of the disc recording medium 1 which has been loaded into the disc apparatus on the shaft of the motor 2. The disc loading sensor 5 outputs a loading detection signal when the disc recording medium 1 has been loaded into the disc apparatus. The chucking control circuit 6 outputs a motor rotation signal for driving the motor 2 so that the hub of the disc recording medium 1 is supported and fastened at the regular position by the chucking mechanism 3 when the disc loading sensor 5 outputs the loading detection signal. The motor drive control circuit 7 drives the motor 2 when at least one of a motor rotation control signal from the chucking control circuit 3 and a motor rotation control signal from an external information processing apparatus 8 are supplied. The information output circuit 9 supplies information obtained from the head 4 to the external information processing apparatus 8 when the supply of the motor rotation control signal from the external information processing apparatus 8 causes the motor 2 to rotate. The output prohibit circuit 10 prohibits the supply of information from the information output circuit 9 to the external information processing apparatus 8 while the motor rotation control signal is being output from the chucking control circuit 6.

Figure 2:
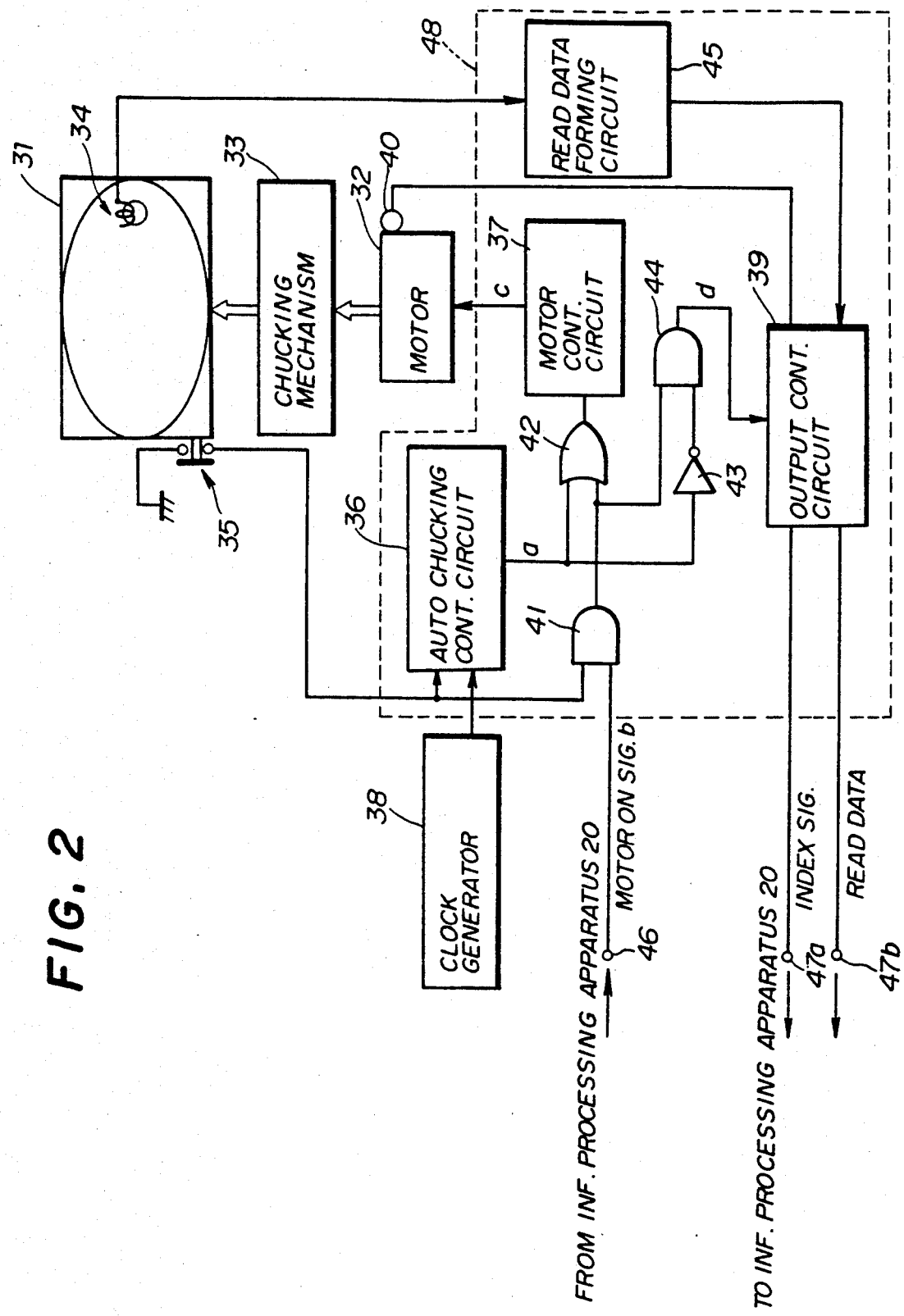
FIG. 2 is a view showing an embodiment of the present invention.
Figure 9:
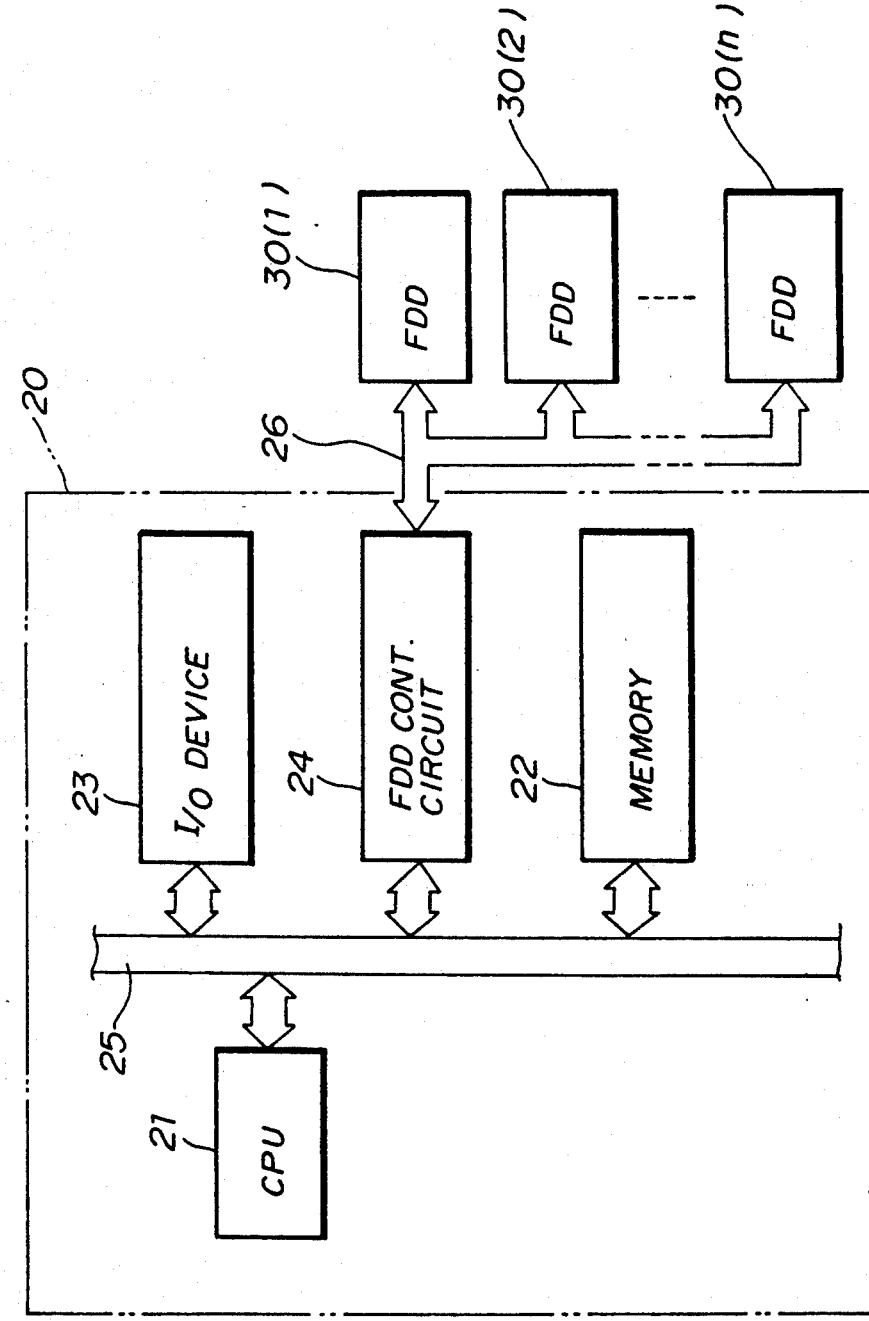
FIG. 9 is a view indicating a configuration of the entirety of the information processing apparatus to which the disc apparatus of the present invention has been applied.

An embodiment of the present invention is shown in FIG. 2. The embodiment is related to a flexible disc apparatus (FDD) that uses a 3.5 inches flexible disc as a recording medium. The configuration of the entirety of the information processing apparatus to which the FDD is applied is the same configuration shown in FIG. 9.

The FDD comprises a motor 32 that rotates a (3.5") flexible disc (hereinafter termed an FD) 31, a head 34 that performs data read and data write with respect to the rotating FD 31, an index sensor 40 to output index pulses in synchronization with the rotational cycle of the motor shaft and a chucking mechanism 33 provided on a shaft of the motor 32. The chucking mechanism 33 supports and fastens the FD 31 at the regular position that is given by positioning the center of the FD 31 which has been loaded into the FDD to the shaft of the motor 32. The FD 31 is a 3.5" flexible disc and the configuration thereof is known. The FD 31 has a hub made of steel on the center thereof. The hub has a first hole formed on the center position and a second hole formed on another portion. The chucking mechanism 33 includes a turn table fixed on the shaft of the motor 32. A magnet and pins corresponding to the first and second holes formed on the hub are provided on the turn table. Then the motor 32 rotates and the pins of the chucking mechanism 33 fit in the first and second holes formed on the hub of the FD 31 so that the positioning of the FD 31 is performed. The hub of the FD 31 is attracted by the magnet and fixed to the turn table of the chucking mechanism 33. The detailed configuration of the chucking mechanism 33 is disclosed in "UPDATE FLOPPY DISC APPARATUS AND APPLICATION KNOW-HOW THEREOF" (pp.57–pp.58) aforementioned.

There is also provided a disc insertion switch 35. Normally the disc insertion switch 35 in ON state, when the FD 31 has been loaded into the FDD the disc insertion switch 35 turns OFF. The disc insertion switch 35 is connected between ground and a auto chucking control circuit 36.

In addition the FDD further comprises a motor drive control circuit 37 that performs drive control of the motor 32, a clock generator 38 that generates various types of clock signals, an auto-chucking control circuit 36, an output circuit 39, a read data forming circuit 45 that converts read signals output from the head 34 to predetermined format digital data so as to form read data, and a logic circuit including AND gates 41, 44, an OR gate 42 and an inverter 43. The auto-chucking control circuit 36 outputs an auto-chucking signal (a)(i.e. the motor rotation control signal) in order to perform chucking operation (i.e. positioning the center of the FD 31 to the rotating motor shaft and supporting and fastening the FD 31) when the disc insertion switch 35 turns OFF. The output control circuit 39 performs output control of the read data and index pulses supplied from the read data forming circuit 45 and the index sensor 40. The read data and index pulses output from the output control circuit 39 are supplied to the information processing apparatus 20 through terminals 47a and 47b. The MOTOR ON signal (b) from the external information processing apparatus 20 is supplied to a terminal 46. The MOTOR ON signal (b) from the terminal 46 and a signal corresponding to the state of the disc insertion switch 35 are input to the AND gate 41. An output signal of the AND gate 41 and auto-chucking signal (a) input to the OR gate 42. The motor drive control circuit 37 outputs a drive signal (c) with respect to the motor 32 when the output signal of the OR gate 42 is active (High-level, hereinafter termed H-level). The auto-chucking signal (a) is then input to an inverter 43 and the output signal of this inverter 43 and the output signal of the AND gate 41 are input to the AND gate 44. The output signal of the AND gate 44 is input to the output control circuit 39 as an output data permitted signal (d).

The motor control circuit 37, auto-chucking control circuit 36, AND gates 41 and 44, OR gate 42, inverter 43 and output control circuit 39 described above are built into a monochip semiconductor element as a control IC (FDC) 48.

The auto-chucking control circuit 36 described above has a configuration shown in FIG. 3A, for example.

Figure 3A:
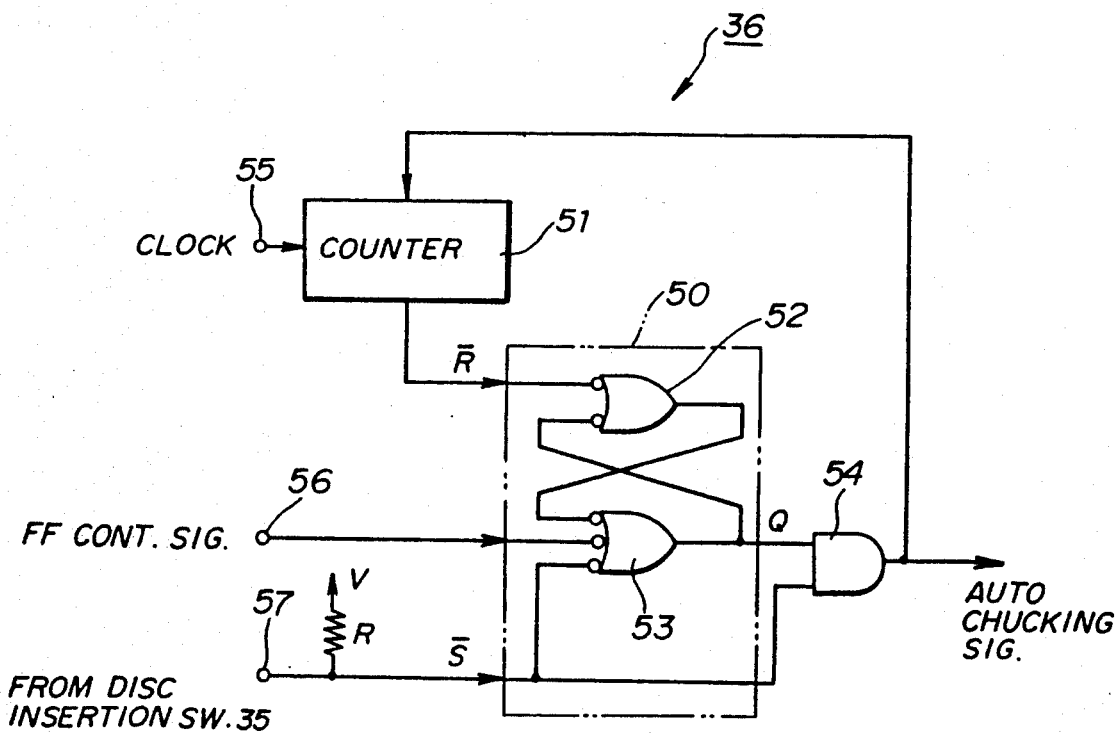
FIG. 3A is a view showing a first configuration of an automatic chucking control circuit.

The auto-chucking control circuit 36 shown in FIG. 3A comprises a counter 51, a R-S flip-flop 50 and an AND gate 54. The counter 51 counts a clock signal input from the clock generator 38 through a terminal 55. The output of the counter 51 becomes active (low-level; hereinafter termed L-level) when the count value have amounted to the predetermined value. A register R is connected between a constant voltage source V and a terminal 57 to which the disc insertion switch 35 is connected. A signal on the terminal 57 becomes a set signal of the R-S flip-flop 50. The output signal from the counter 51 becomes a reset signal of the R-S flip-flop 50. The R-S flip-flop 50 comprises a two inputs NOT OR gate 52 and a three inputs NOT OR gate 53. The signal on the terminal 57 is input to the NOT OR gate 53 and the output signal from the counter 51 is input to the NOT OR gate 52. A FF control signal for controlling the R-S flip-flop 50 is input to a terminal 56. The FF control signal is supplied from a control circuit (not indicated in the figure). The FF control signal is input to the NOT OR gate 53 of the flip-flop 50 through the terminal 56. The FF control signal rises to H-level at a time ($t_1$) after predetermined time $\tau$ from a time ($t_0$) at which a power source of the FDD turns ON. An output Q of the R-S flip-flop 50 and the signal on the terminal 57 are input to the AND gate 54. The output signal of the AND gate 54 is returns to the counter 51 as a start signal, and the output signal of the AND gate 54 becomes the auto-chucking signal (a). The count value until the output is switched to active set in the counter 51 is determined as a value corresponding to the time required for chucking operation.

The auto-chucking control circuit 36 having the configuration described above operates as follows.

When the FD31 has not been loaded in the FDD and the power source of the FDD is turned ON, immediately the signal on the terminal 57 falls to L-level because of the ON state of the disc insertion switch 35. Accordingly the output Q of the R-S flip-flop 50 rises to H-level when the power source is turned ON and the H-level state is held as it is (set state). When the FD 31 has been loaded into the FDD, the disc insertion switch 35 turns OFF so that the voltage of the terminal 57 rises to H-level. And the output of the AND gate 54 rises to H-level. That is, the auto-chucking signal (a) rises to H-level. The switching to H-level of the auto-chucking signal (a) causes the counter 51 to start.

Figure 3B:
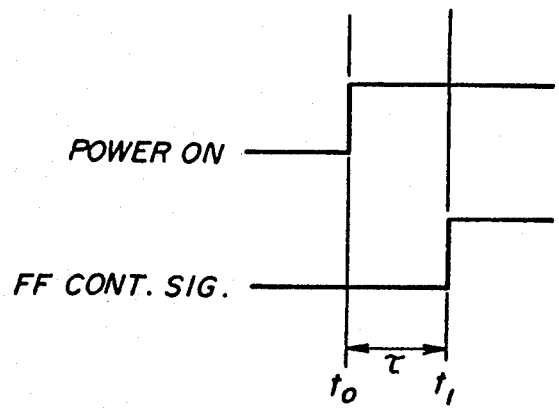
FIG. 3B is a timing chart of a power on signal and a FF control signal.

When the count value in the counter 51 has been reached to the predetermined value, the output of the counter 51 switches to active (L-level). It causes the R-S flip-flop 50 to reset. When R-S flip-flop 50 is reset, the output of the AND gate 54 falls to L-level and the auto-chucking signal (a) falls to L-level. The FF control signal rises to H-level at timing indicated in FIG. 3B. The FF control signal prevents that the R-S flip-flop 50 becomes to an indefinite state when the power source is turned ON in a state where FD 31 is loaded into the FDD. When the FD 31 is loaded into the FDD. When the FD 31 is loaded into the FDD the disc insertion switch 35 is turned OFF. In this state, when the power source is turned ON H-level signals are supplied to all inputs of the NOT OR gate 53 of the R-S flip-flop 50 unless the FF control signal is supplied to the NOT OR gate 53. When H-level signals are supplied to all inputs of the NOT OR gate 53, the R-S flip-flop 50 becomes an infinite state. Accordingly, the FF control signal inputs to the NOT OR gate 53 so that the output Q of the R-S flip-flop 50 is H-level without exception when the power source is turned ON.

A second configuration of the auto-chucking control circuit 36 is shown in FIG. 4. In FIG. 4 those parts which the same as those shown in FIG. 3A are given the same reference numbers.

The auto-chucking control circuit 36 shown in FIG. 4 comprises in addition to the counter 51 and the R-S flip-flop 50, an index counter 59 and a index cycle counter 60. The index pulses from the index sensor 40 are supplied to the index counter 59 and the index cycle counter 60 through a terminal 58. The index counter 59 counts the index pulses, and when the count value reaches to a predetermined value the output signal of the index counter 59 becomes active. The output signal of the index cycle counter 60 becomes active when the cycle of the index pluses falls below a predetermined value. The index counter 59 is stated when the output signal of the index cycle counter 60 becomes active. The output signal of the counter 51 and the output signal of the index counter 59 are input to an AND gate 61 which is indicated on the basis of the negative logic and the output signal of the AND gate 61 are input to the reset terminal ($\overline{R}$) of the R-S flip-flop 50. The signal on the terminal 57 is input to the set terminal ($\overline{S}$) of the R-S flip-flop 50 in the same manner as has been described above. The FF control signal is input to the R-S flip-flop 50 through the terminal 56. The output Q of the R-S flip-flop 50 and the signal on the terminal 57 is input to the AND gate 54, and the output of the AND gate 54 becomes the start signal of the counter 51 and also becomes the auto-chucking signal (a). In the auto-chucking circuit 36 having the construction shown in FIG. 4, the auto-chucking signal (a) which has risen to H-level when the FD 31 is loaded into the FDD switches to L-level when the period for the chucking operation has passed and when the index pulse cycle has become stable, that is to say, after the rotation of the motor 32 has become stable.

Figure 5:
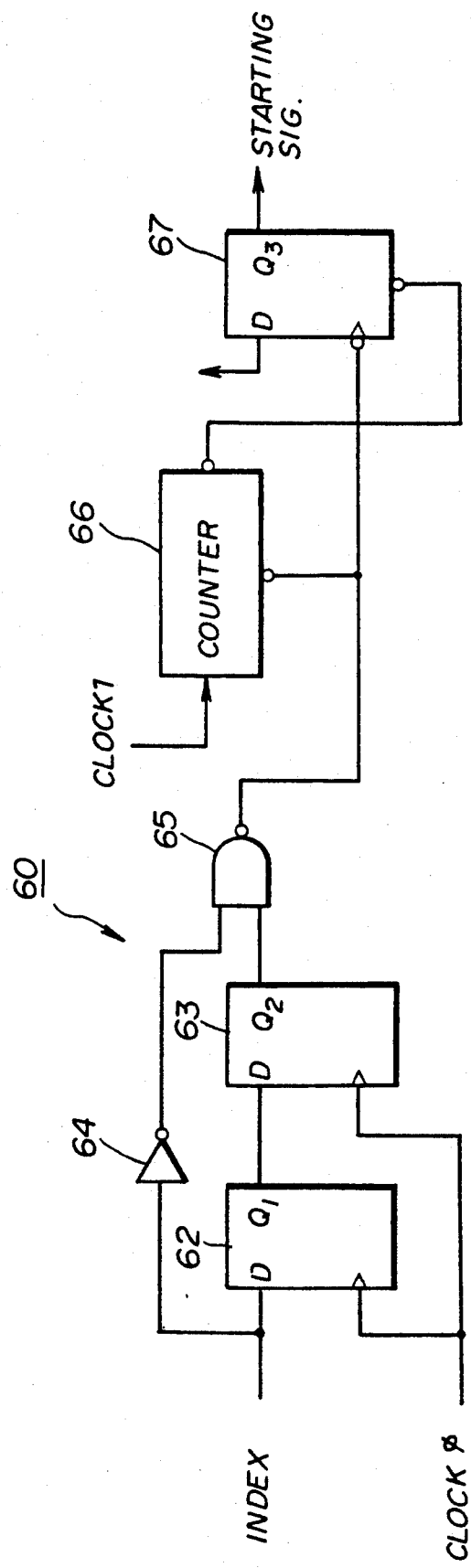
FIG. 5 is a view showing a configuration of the index cycle counter.

A configuration of the index cycle counter 60 is indicated in FIG. 5, for example.

The index pulse is input to a data terminal (D) of a D flip-flop 62, and an output Q1 signal of the D flip-flop 62 is input to a data terminal (D) of a next D flip-flop 63. The clock signal $\phi$ is input to clock terminals of the D flip-flop 62 and the D flip-flop 63. The index pulse is input to an inverter 64 and an output signal of the inverter 54 and an output Q2 signal of the D flip-flop 63 are input to a NAND gate 65. An output signal of the NAND gate 65 is input to a counter 66 as a start signal and at the same time is input to a clock terminal of a D flip-flop 67. The counter 66 is started upon the fall of the output signal of the NAND gate 65 and its output rises. Then, the counter 66 counts a clock signal 1 and the output falls when that count value reaches a predetermined value. The D flip-flop 67 has its data terminal (D) fixed to the H-level, and the output signal of the NAND gate 65 previously described is input to the clock terminal, and the output signal of the counter 66 is input to the reset terminal of the D flip-flop 67. An output Q3 signal of this D flip-flop 67 becomes the start signal for the index counter 59.

Normally, when the index pulse cycle is about 3 msec for example, the cycle of the clock $\phi$ is 4 $\mu$sec and the cycle of the clock 1 is 1 msec. In addition, the count value from the rise of the output of the counter 66 until the fall of the output of the counter 66 is normally set at a value corresponding to time longer than the cycle of the index pulse. The count value is set for example, at a value corresponding to 1.5 times the cycle of the index pulse.

Figure 6A:
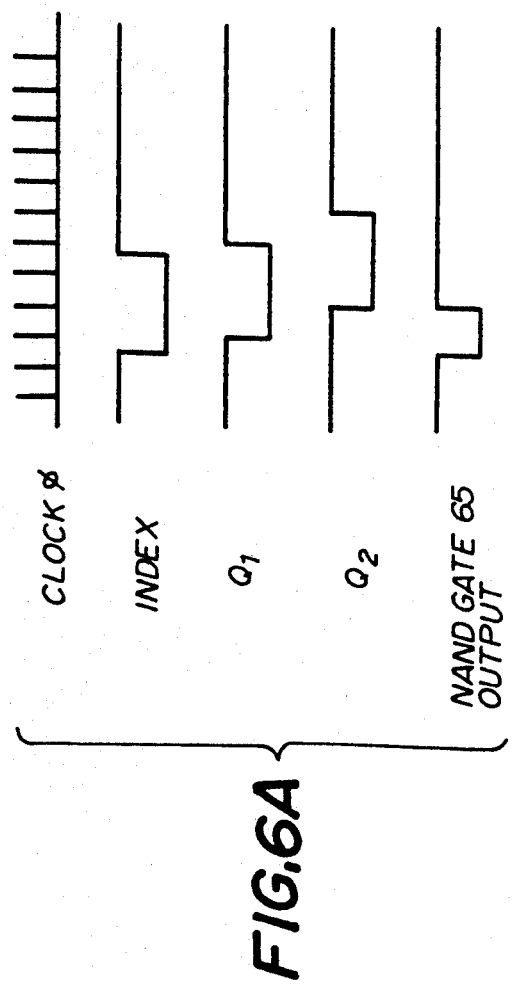
FIG. 6A and FIG. 6B are timing charts indicating the operation of the index cycle counter.

In the index cycle counter 60 having the configuration as described above and as indicated in FIG. 6A, the index pulse, and the output Q1 signal of the D flip-flop 62 and the output Q2 signal of the D flip-flop 63 lag in order in accordance with the clock $\phi$. Accordingly, the index pulse and the output Q2 signal of the D flip-flop 63 are used as the basis for the output signal of the NAND gate 65 to fall along with the index pulse to become a short pulse signal. The output signal of the NAND gate 65 is a signal that is synchronized with the index pulse. The circuit including the D flip-flops 62, 63, the inverter 64 and NAND gate 65 forms a pulse signal. The pulse signal has a much narrower width than the index pulse and the clock 1 but is enough width to start the counter 66 and the trigger the D flip-flop 67.

Figure 6B:
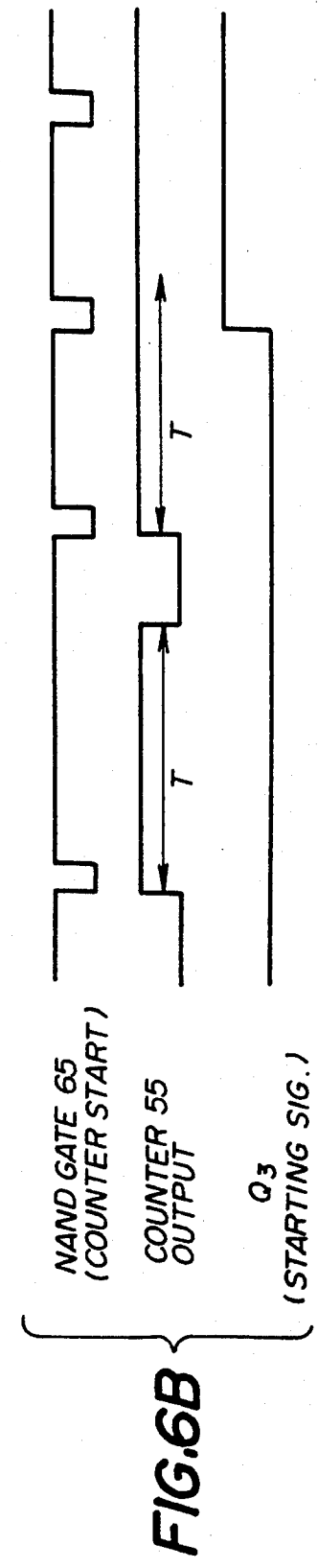

The output signal of the NAND gate 65 is a signal that is synchronized with the index pulse. In the chucking operation, the pulse cycle of the signals output from the NAND gate 65 in accordance with the stabilization of the rotation of the motor after it has started rotating, becomes progressively shorter. As indicated in FIG. 6B, when the index pulse has not attained its normal cycle, the output signal of the counter 66 started by the output signal of the NAND gate 65 falls each time the output of the started counter 66 reaches a predetermined count value (corresponding to the time T). In this case, the output Q3 of the D flip-flop 67 is held at the low level. Accordingly, the index counter 59 is not started. When the speed of rotation of the motor 32 rises and the cycle of the index pulses reaches a predetermined cycle, the counter 66 is restarted prior to the fall of that output signal so that the output signal of the counter 66 is held at the H-level. When the output level of this counter 66 reaches the H-level and the output signal of the NAND gate 65 falls, the output signal of the D flip-flop 67 rises to the H-level and this state is maintained. Accordingly, the index counter 59 is started and then the output signal of the index counter 59 rises when the index counter 59 reaches a predetermined count value.

Figure 7:
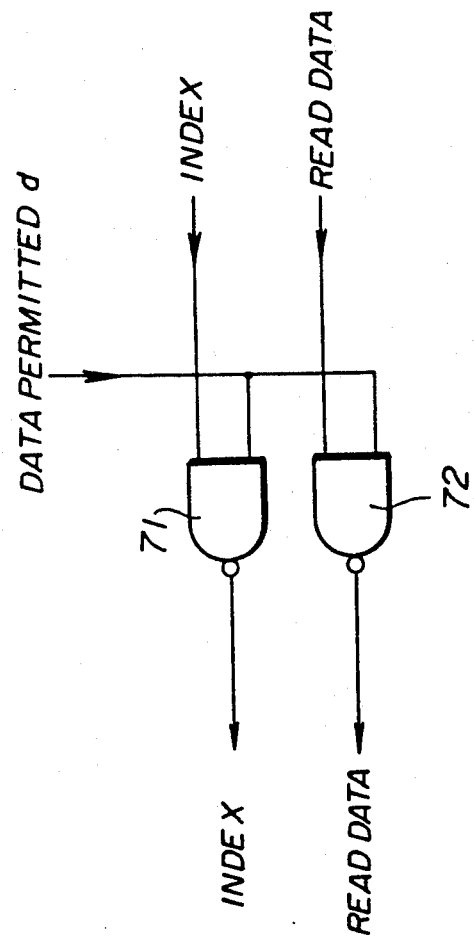
FIG. 7 is a view showing a configuration of an output control circuit.

A configuration of the output control circuit 39 in FIG. 2 is shown in FIG. 7.

The output control circuit 39 comprises two NAND gates 71 and 72 that are gate controlled by the output permitted signals (d) from the AND gate 44. The index signals from the index sensor 40 are input to the NAND gate 71 and the read data from the read data forming circuit 45 is input to the NAND gate 72. The output signal of the NAND gate 71 is supplied to the FDD bus 26 as the index signal and the output signal of the NAND gate 72 is supplied to the FDD bus 26 as the read data.

Figure 8:
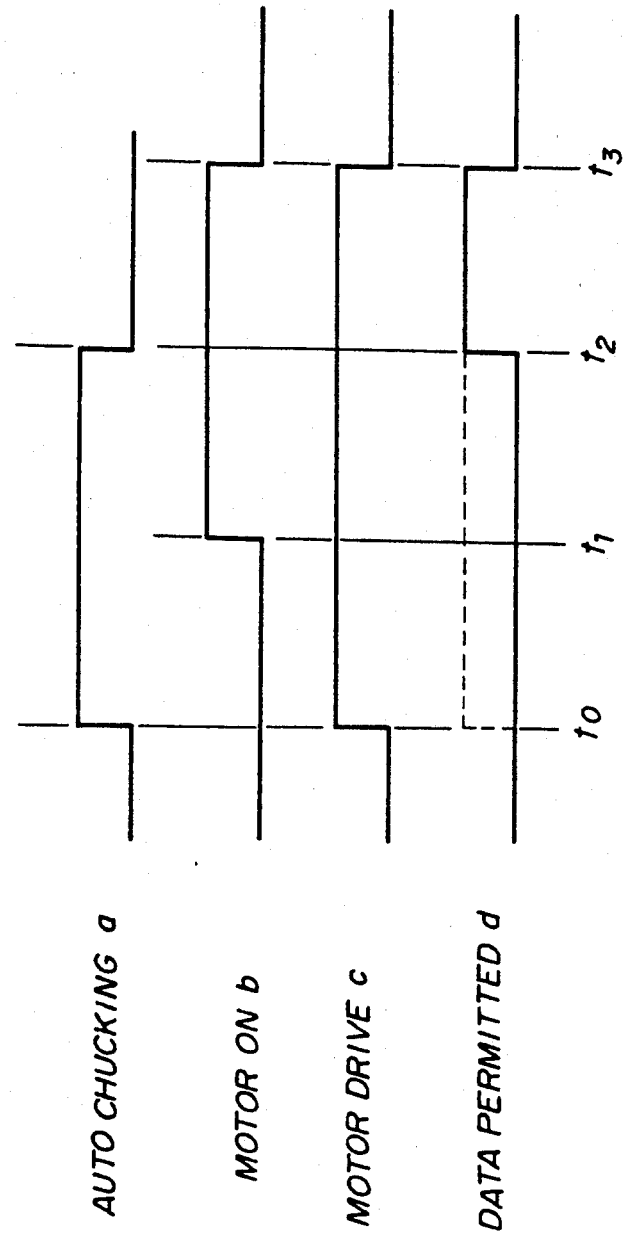
FIG. 8 is a timing chart indicating the operation of the flexible disc drive control apparatus according to the present invention.

In the FDD having the configuration described above, the status of the signals of each of the parts are as indicated in FIG. 8. The FD 31 is loaded in the FDD and the auto-chucking signal (a) from the auto-chucking control circuit 36 becomes in a predetermined time (the interval between $t_0$ and $t_2$) and then, when the MOTOR ON signal (b) is supplied from FDD control circuit 24 in the time from $t_1$ to $t_3$, the output signal of the OR gate 42 becomes the H-level for the time $t_0$ to $t_3$ when either the auto-chucking signal (a) or the MOTOR ON signal (b) described above become the H-level. The motor drive signal (c) is output from the motor drive control circuit 37 to the motor 32 in response to the output signal of the OR gate 42 (in the time $t_0$ to $t_3$). This motor drive signal (c) is used as the basis for the start of the motor 32 and for the chucking operation to be performed by the chucking mechanism 33 (in the time $t_0$ to $t_2$). The motor 32 continues to rotate even after the chucking operation has finished (in the time $t_2$ to $t_3$) As has been described above, during the time that the FD 31 is rotating because of the motor 32, in the interval $t_0$ to $t_2$ when the auto-chucking signal (a) is at the H-level, the output of the AND gate 44 in FIG. 2, namely the output data permitted signal (d) becomes the L-level and so the output signals of each of the NAND gate 71 and the NAND gate 72 are fixed at the H-level. After this, when the auto-chucking signal (a) falls (and the chucking operation has finished), the output data permitted signal (d) becomes the H-level for the duration (from $t_2$ to $t_3$) when the MOTOR ON signal (b) from the FDD control circuit 24 is at the H-level. When this output data permitted signal (d) is at the H-level, the read data from the read data forming circuit 45 and the index signal from the index sensor 40 are supplied to the information processing apparatus 20 via the NAND gate 71 and the NAND gate 72. In the case, the information processing apparatus 20 recognize the information because of the change from the H-level to the L-level and as has been described above, when the output of the output control circuit 39 (the NAND gate 71 and the NAND gate 72) is fixed at the H-level data transfer from the FDD to the information processing apparatus 20 is prohibited.

After the chucking operation for the FD 31 has finished and MOTOR ON signals (b) are supplied from the FDD control circuit 24 the output data permitted signal (d) rises along with the MOTOR ON signal (b). Then, immediately after the start of the motor 32, the read data from the read data forming circuit 45 and the index signal from the index sensor 40 are supplied to the information processing apparatus 20 through the output control circuit 39.

According to the embodiment described above, the output data permitted signal (d) is at the H-level during the time that the auto-chucking signal (a) is at the H-level, and the output signals of each of the NAND gates 71 and 72 of the output control circuit 33, are fixed at the high level. Accordingly, the read data and index signals that are unstable during the time that the chucking operation is being performed for the FDD are not supplied to the information processing apparatus 20.

Because of this, there is no erroneous operation due to incorrect read data and index signals even if the FDD is accessed by the information processing apparatus 20 immediately after the FD31 has been loaded in the FDD.

In the embodiment describe above, the information can be recognized when the signal of the information processing apparatus falls and so in the output control circuit 39, the fixing of the read data and the index data at the H-level prohibit the output of data with respect to the information processing apparatus 20. This prohibiting of the data output is also possible by other means. These methods for prohibiting the output of data are decided according to method for data recognition of the information processing apparatus 20.

In the present invention, the supply of information from the information output means to the external information processing apparatus is prohibited when the motor rotation control signals from the chucking control means is output. When the motor rotates due to chucking operation for the FDD, the read data is not output from the FDD even if the FDD is accessed by external information processing apparatus. Accordingly, in the information processing apparatus, there is no erroneous operation caused by read data from the FD during the chucking operation in which the rotation of the disc is unstable.

The present invention is not limited to the aforementioned embodiment, and variations and modifications may be made without departing from the scope of the invention.

What is claimed is:

1. A disc apparatus which is controlled by an external processing apparatus, said disc apparatus comprising:

a drive mechanism rotatively driving a disc recording medium recording information and having a hub at a center thereof, said drive mechanism including a motor and chucking mechanism provided on a shaft of said motor, said chucking mechanism supporting and fastening the hub of said disc recording medium at a regular position that is given by positioning the center of the disc recording medium which has been loaded into the disc apparatus on the shaft of said motor;

a head reading out information from said disc recording medium;

disc loading detection means for outputting a loading detection signal when said disc recording medium has been loaded into said disc apparatus;

chucking control means for outputting a first signal for driving said motor when said disc loading detection means outputs the loading detection signal and during an interval in which the support and fastening of the hub of said disc recording medium at the regular position is carried out by said chucking mechanism;

motor drive control means for driving said motor when at least one of the first signal from said chucking control means and a second signal from said external information processing apparatus is supplied;

information output means for supplying information obtained from said head to said external information processing apparatus when the motor is being driven by said motor drive control means; and output prohibit means for prohibiting the supply of information from said information output means to said external information processing apparatus during the interval in which the first signal is outputted from said chucking control means.

2. The disc apparatus as claimed in claim 1, wherein said disc loading detection means has a switch, the state of which is altered when said disc recording medium has been loaded into said disc apparatus.

3. The disc apparatus as claimed in claim 1, wherein said chucking control means includes timer means for measuring time starting from a time at which the loading detection signal is outputted from said disc loading detecting means, and signal control means for outputting the first signal starting from a time when said loading detection signal is outputted from said disc loading detection means until the time measured by said timer means becomes equal to a predetermined value.

4. The disc apparatus as claimed in claim 3, wherein said timer means has counter counting a clock signal having a constant cycle and outputting a time-up signal when a count value attains a predetermined value, and said signal control means has a flip-flop which is set by said loading detection signal from said disc loading detection means and is reset by said time-up signal from said counter.

5. The disc apparatus as claimed in claim 1, wherein said chucking control means includes rotation cycle detection means for detecting that a rotation cycle of said disc recording medium rotated by said motor attains a first predetermined value, timer means for measuring time starting from a time at which said loading detection signal is outputted from said disc loading detection means, and signal control means for outputting the first signal starting from a time when said loading detection signal is outputted from said disc loading detection means until the time measured by said timer means becomes equal to a second predetermined value and said rotation cycle detection means detects that the rotation cycle of said disc recording medium attains the first predetermined value.

6. The disc apparatus as claimed in claim 1, wherein said output prohibit means includes a first logic circuit inputting the first signal from chucking control means and outputting an inverted signal of the first signal, a second logic circuit inputting said loading detection signal from said disc loading detection means and the second signal from said external information apparatus and outputting a logical resultant signal of said loading detection signal and the second signal, and a third logic circuit inputting signals from said first and second logic circuits and outputting a logical resultant signal of the input signals, and wherein the supply of information from said information output means to said external information processing apparatus is prohibited when the signal output from said third logic circuit is inactive.

7. The disc apparatus as claimed in claim 6, wherein said first logic circuit comprises an invertor inputting the first signal from said chucking control means, said second logic circuit comprises a first AND gate inputting said loading detection signal from said disc loading detection means and the second signal from external processing apparatus, and said third logic circuit comprises a second AND gate inputting signals from said invertor and said first AND gate.

8. The disc apparatus as claimed in claim 5, wherein said rotation cycle detection means comprises pulse generator means for generating an index pulse in synchronism with a rotation of the motor; first means, coupled to said pulse generator means, for determining whether or not said disc recording medium is rotated at a rotation cycle less than or equal to the first predetermined value and for outputting a first detection signal while a determination result that said disc recording medium is rotated at the rotation cycle less than or equal to the first predetermined value is being obtained; and second means, coupled to said pulse generator means and said first means, for counting the index pulses while said first means is outputting the first detection signal and for outputting a second detection signal when a count value obtained by said second means reaches a predetermined value, and wherein when the second means outputs the second detection signal, said rotation cycle detection means detects that the rotation cycle of said disc recording medium has attained the first value.

* * * * *